(12) United States Patent
Makino et al.

(10) Patent No.: US 11,155,161 B2
(45) Date of Patent: Oct. 26, 2021

(54) MOTOR DRIVE DEVICE FOR AUTOMOBILE AND EQUIPPED WITH SPEED REDUCER

(71) Applicant: NTN CORPORATION, Osaka (JP)

(72) Inventors: Tomoaki Makino, Shizuoka (JP); Isao Hirai, Shizuoka (JP); Yusuke Shibuya, Shizuoka (JP)

(73) Assignee: NTN CORPORATION, Osaka (JP)

(*) Notice: Subject to any disclaimer, the term of this patent is extended or adjusted under 35 U.S.C. 154(b) by 244 days.

(21) Appl. No.: 15/565,787

(22) PCT Filed: Apr. 14, 2016

(86) PCT No.: PCT/JP2016/062024
§ 371 (c)(1),
(2) Date: Oct. 11, 2017

(87) PCT Pub. No.: WO2016/167321
PCT Pub. Date: Oct. 20, 2016

(65) Prior Publication Data
US 2018/0118023 A1  May 3, 2018

(30) Foreign Application Priority Data

Apr. 17, 2015  (JP) .............................. JP2015-084762

(51) Int. Cl.
*B60K 17/14* (2006.01)
*F16H 1/20* (2006.01)
(Continued)

(52) U.S. Cl.
CPC .............. *B60K 17/145* (2013.01); *B60K 1/00* (2013.01); *B60K 7/0007* (2013.01);
(Continued)

(58) Field of Classification Search
CPC .... F16H 57/04; F16H 57/021; F16H 57/0424; F16H 57/0428; F16H 1/06; F16H 1/20;
(Continued)

(56) References Cited

U.S. PATENT DOCUMENTS 3,763,961 A * 10/1973 Casale ..................... F16N 7/26
184/11.2
4,952,078 A * 8/1990 Ankenbauer ......... F16C 37/007
384/476
(Continued)

FOREIGN PATENT DOCUMENTS

| CN | 102913606 | 2/2013 |
|----|-----------|--------|
| CN | 103547836 | 1/2014 |

(Continued)

OTHER PUBLICATIONS

International Search Report dated Jul. 5, 2016 in International (PCT) Application No. PCT/JP2016/062024.
(Continued)

*Primary Examiner* — John D Walters
(74) *Attorney, Agent, or Firm* — Wenderoth, Lind & Ponack, L.L.P.

(57) ABSTRACT

An automobile-motor driving device equipped with speed reducer which has improved supply of lubrication oil to inside of the rolling bearings without sacrificing the function of the bearings, to reduce deformation in the rolling bearing outer ring. A parallel shaft gear speed reducer provides an automobile-motor driving device equipped with speed reducer. The parallel shaft gear speed reducer includes a plurality of gear shafts having two ends supported via rolling bearings fitted into bearing fitting holes in a speed reducer casing which houses the parallel shaft gear speed reducer. A groove in an inner circumferential surface of the bearing fitting hole into which the rolling bearing is fitted communicates between a space that houses the speed reducer and an
(Continued)

inside space of the bearing fitting hole, at a location not crossed by the line of action of a load acting upon the rolling bearing due to the meshing of the gears.

3 Claims, 8 Drawing Sheets

(51) Int. Cl.
F16H 57/021 (2012.01)
F16H 1/06 (2006.01)
F16H 57/04 (2010.01)
B60K 1/00 (2006.01)
B60K 17/04 (2006.01)
B60K 7/00 (2006.01)
F16H 57/02 (2012.01)

(52) U.S. Cl.
CPC ............. *B60K 17/043* (2013.01); *F16H 1/06* (2013.01); *F16H 1/20* (2013.01); *F16H 57/021* (2013.01); *F16H 57/04* (2013.01); *B60K 2001/001* (2013.01); *B60K 2007/0046* (2013.01); *B60K 2007/0061* (2013.01); *B60Y 2306/03* (2013.01); *F16H 2057/02047* (2013.01)

(58) Field of Classification Search
CPC ...... B60K 17/145; B60K 17/043; B60K 1/00; B60K 7/0007
See application file for complete search history.

(56) References Cited

U.S. PATENT DOCUMENTS

| | | | | |
|---|---|---|---|---|
| 5,821,653 A * | 10/1998 | Kinto | ................ | F16H 57/0447 310/89 |
| 6,896,491 B2 * | 5/2005 | Trubnikov | .............. | F16C 35/04 384/537 |
| 8,036,863 B2 * | 10/2011 | Schankin | .............. | F16C 35/067 703/2 |
| 8,336,655 B2 * | 12/2012 | Knoblauch | .............. | B60K 1/02 180/65.6 |
| 9,266,705 B2 * | 2/2016 | Kanna | ................. | B60K 7/0007 |
| 9,835,242 B2 * | 12/2017 | Itoo | ........................ | F16D 11/14 |
| 9,909,660 B2 * | 3/2018 | Toaso, Jr. | ............ | F16H 57/0423 |
| 2009/0014223 A1 * | 1/2009 | Jones | ....................... | B60K 1/02 180/65.8 |
| 2009/0204247 A1 * | 8/2009 | Schankin | .............. | F16H 57/021 700/103 |
| 2011/0139522 A1 | 6/2011 | Takenaka et al. | | |
| 2014/0011622 A1 * | 1/2014 | Sone | ................... | F16C 33/7813 475/159 |
| 2014/0033846 A1 | 2/2014 | Suto et al. | | |
| 2014/0141918 A1 | 5/2014 | Fukami et al. | | |
| 2014/0157954 A1 * | 6/2014 | Zettergren | ............. | B22D 19/02 74/606 R |
| 2014/0262675 A1 | 9/2014 | Sugiyama et al. | | |
| 2015/0014085 A1 * | 1/2015 | Kanna | ................. | F16H 57/0424 180/346 |
| 2017/0305269 A1 * | 10/2017 | DeCorte | ............. | F16H 57/0408 |
| 2018/0015815 A1 * | 1/2018 | Makino | ................. | F16H 57/021 |

FOREIGN PATENT DOCUMENTS

| | | |
|---|---|---|
| EP | 2 835 562 | 2/2015 |
| JP | 58-16497 | 7/1981 |
| JP | 6-101749 | 4/1994 |
| JP | 11-243664 | 9/1999 |
| JP | 2000-71789 | 3/2000 |
| JP | 2001-190042 | 7/2001 |
| JP | 2010-48379 | 3/2010 |
| JP | 2013-212918 | 10/2013 |
| WO | 2007/017221 | 2/2007 |

OTHER PUBLICATIONS

International Preliminary Report on Patentability dated Oct. 17, 2017 in International (PCT) Application No. PCT/JP2016/062024.
Extended European Search Report dated Nov. 28, 2018 in European Patent Application No. 16780112.5.
Office Action dated Jun. 27, 2019 in Chinese Patent Application No. 201680022065.3, with partial English translation.
Notice of Reasons for Refusal dated Jul. 2, 2019 in corresponding Japanese Patent Application No. 2015-084762, with English Translation.

* cited by examiner

MOTOR DRIVE DEVICE FOR AUTOMOBILE AND EQUIPPED WITH SPEED REDUCER

TECHNICAL FIELD

The present invention relates to an automobile-motor driving device equipped with speed reducer including: an electric motor; and a speed reducer for reducing and then transmitting power from the electric motor to driving wheels. The speed reducer is provided by a parallel shaft gear speed reducer including a plurality of gear shafts disposed in parallel to each other in a casing.

BACKGROUND ART

Patent Literature 1 discloses an automobile-motor driving device equipped with speed reducer composed of: two electric motors for driving a left and a right driving wheels independently from each other; and a speed reducer.

As shown in FIG. 9, this conventional automobile-motor driving device equipped with speed reducer includes: left and right electric motors 101 for driving left and right driving wheels independently from each other; and two speed reducers 102 for decreasing rotation of the electric motors 101. The two speed reducers 102 are disposed at a center between the left and right electric motors 101.

As shown in FIG. 9, the speed reducer 102 is a parallel shaft gear speed reducer including: an input gear shaft 123 which has an input gear for receiving power from a motor shaft 112; a plurality of intermediate gear shafts 124 which have a large-diameter gear for engagement with the input gear of the input gear shaft 123 and a small-diameter gear for engagement with an output gear; and an output gear shaft section 125 which has the output gear, and is extended from a speed reducer casing 128 for transmission of driving power to the driving wheel via a constant-velocity joint 126 and an intermediate shaft 127. Each gear is provided by a helical gear, while each gear shaft has its two ends rotatably supported by the speed reducer casing 128 via rolling bearings. Also, in each of the left and right gear shafts, the two gear shafts of the same numbers, i.e., 123, 124 and 125 are disposed coaxially with each other.

In such rolling bearings which support each gear shaft of the speed reducer, it is necessary, in order to prevent damages such as seizure, and to satisfy requirements of rolling fatigue life, to supply a suitable amount of lubrication oil to bearing track surfaces and contact areas between rolling elements and retainers.

A typical lubrication method for gear speed reducers is oil bath method. In the oil bath method, lubrication oil pooled in a lower part of the speed reducer casing is kicked up by the gears to supply splashes of oil to tooth surfaces and the rolling bearings.

However, simple oil bath lubrication can cause a problem when the rolling bearings are rotating at high speed; i.e., rotating movement of the rolling elements and the retainer can prevent lubrication oil from flowing into the interior of the rolling bearings.

As a solution, there is a proposed method of supplying a bearing with lubrication oil by means of through-shaft lubrication to supply lubrication oil to an oil reservoir between the bearing and the casing (see Patent Literature 2).

CITATION LIST

Patent Literature

Patent Literature 1: JP-A H11-243664 Gazette
Patent Literature 2: JP-A 2000-71789 Gazette

SUMMARY OF INVENTION

Technical Problem

As a means for supplying lubrication oil to rolling bearings, the inventors of the present invention et al. built a prototype. In a casing into which a rolling bearing is inserted, a groove was formed in a fitting surface with the bearing's outer ring, and an oil reservoir was formed in the casing's bearing region to enable active oil lubrication. It was found, however, that formation of a groove in a casing's fitting surface with the outer ring can lead to deformation of the outer ring due to a load applied to the outer ring via the rolling element of the rolling bearing when the rolling elements roll over a phase of the groove. If the outer ring is deformed, the outer ring track surface will no longer have sufficient level of roundness, and can adversely affect on vibration, noise, durability, etc.

It is therefore an object of the present invention to reduce deformation in the rolling bearing outer ring, thereby providing an automobile-motor driving device equipped with speed reducer which has improved supply of lubrication oil to inside of the rolling bearings without sacrificing the function of the bearings.

Solution to Problem

In order to solve the above-described problem, the present invention provides an automobile-motor driving device equipped with speed reducer including: an electric motor; and a speed reducer for reducing and then transmitting power from the electric motor to a driving wheel. The speed reducer is provided by a parallel shaft gear speed reducer including an input gear shaft having an input gear for receiving power from a motor shaft, an output gear shaft having an output gear for transmitting driving power to the driving wheel, and one or more intermediate gear shafts having intermediate gears provided between the input gear shaft and the output gear shaft. The parallel shaft gear speed reducer has a plurality of gear shafts supported at their two ends via rolling bearings which are fitted into bearing fitting holes formed in a speed reducer casing that houses the parallel shaft gear speed reducer. The bearing fitting holes which are fitted with the rolling bearings have their inner circumferential surfaces formed with at least one groove for communication between a space that houses the speed reducer and an inside space of the bearing fitting hole, at a location not crossed by a line of action of a load acting upon the relevant rolling bearing due to the meshing of the gears.

The automobile-motor driving device equipped with speed reducer according to the present invention may include one electric motor and one speed reducer.

Also, the automobile-motor driving device equipped with speed reducer according to the present invention may include: two electric motors each for driving one of left and right driving wheels independently from each other; and two speed reducers each for reducing and then transmitting power from these electric motors to left and right driving wheels independently from each other.

Advantageous Effects of Invention

As described above, according to the present invention, since there is provided at least one groove which provides communication between a space in the casing that houses the speed reducer and an inside space of the bearing fitting hole, it is possible to supply lubrication oil to the inside of the bearing. Further, by forming the groove at a location not crossed by a line of action of a load acting upon the rolling bearing, there is reduced deformation on the bearing's outer ring when the rolling bearing rolls over a phase of the groove, and therefore it is possible to prevent performance decay of the bearing.

DESCRIPTION OF EMBODIMENTS

Hereinafter, embodiments of the present invention will be described with reference to the attached drawings.

Figure 1:
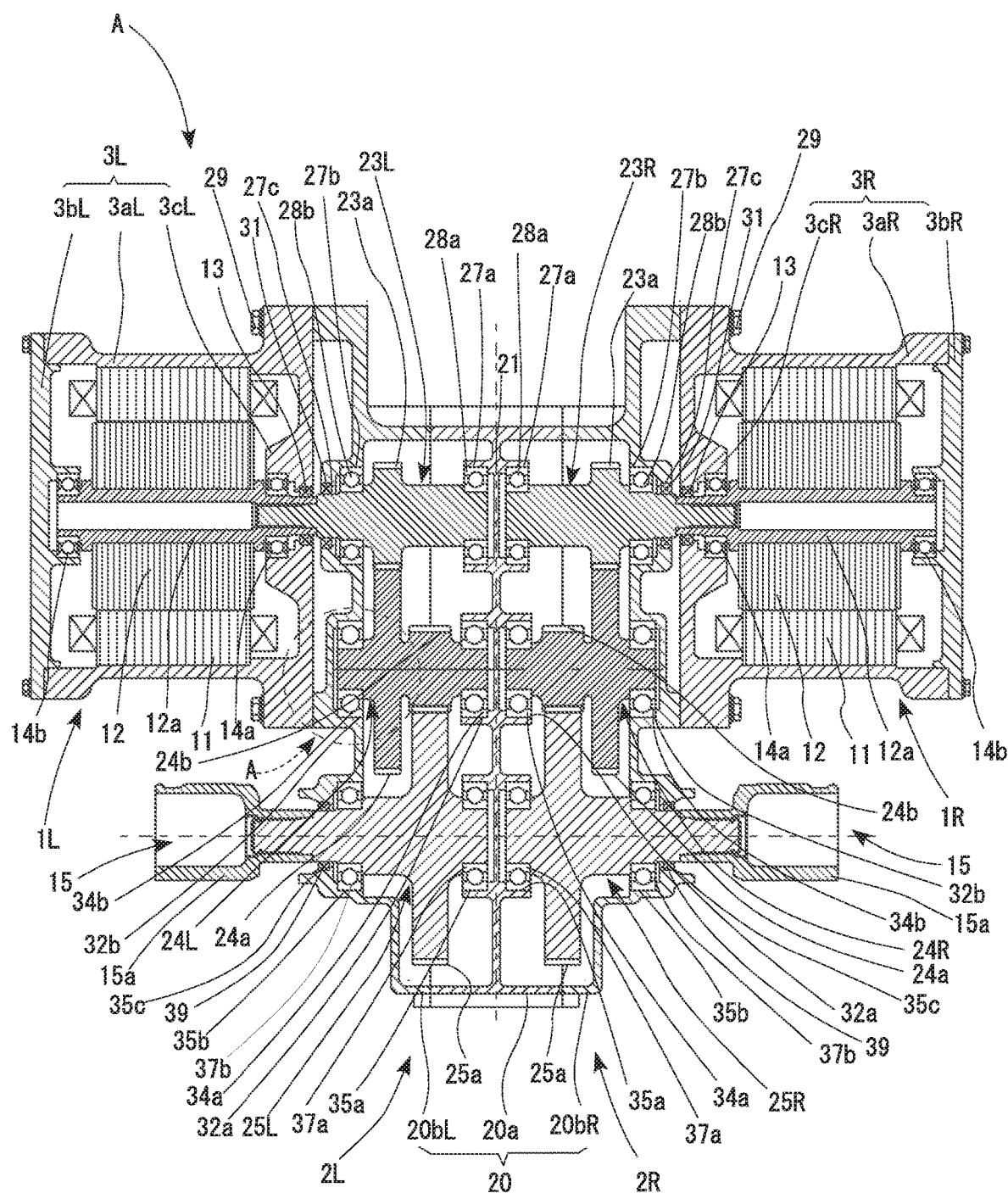
FIG. 1 is a cross-sectional plan view which shows an embodiment of a two-motor automobile-motor driving device equipped with speed reducer according to the present invention.

FIG. 1 shows an automobile-motor driving device equipped with speed reducer A: A speed reducer casing 20 which houses two speed reducers 2L, 2R side by side, one on the left and the other on the right, is placed in the center; and motor casings 3L, 3R of two electric motors 1L, 1R are disposed in a fixed fashion on the left and right side of the speed reducer casing 20.

Figure 2:
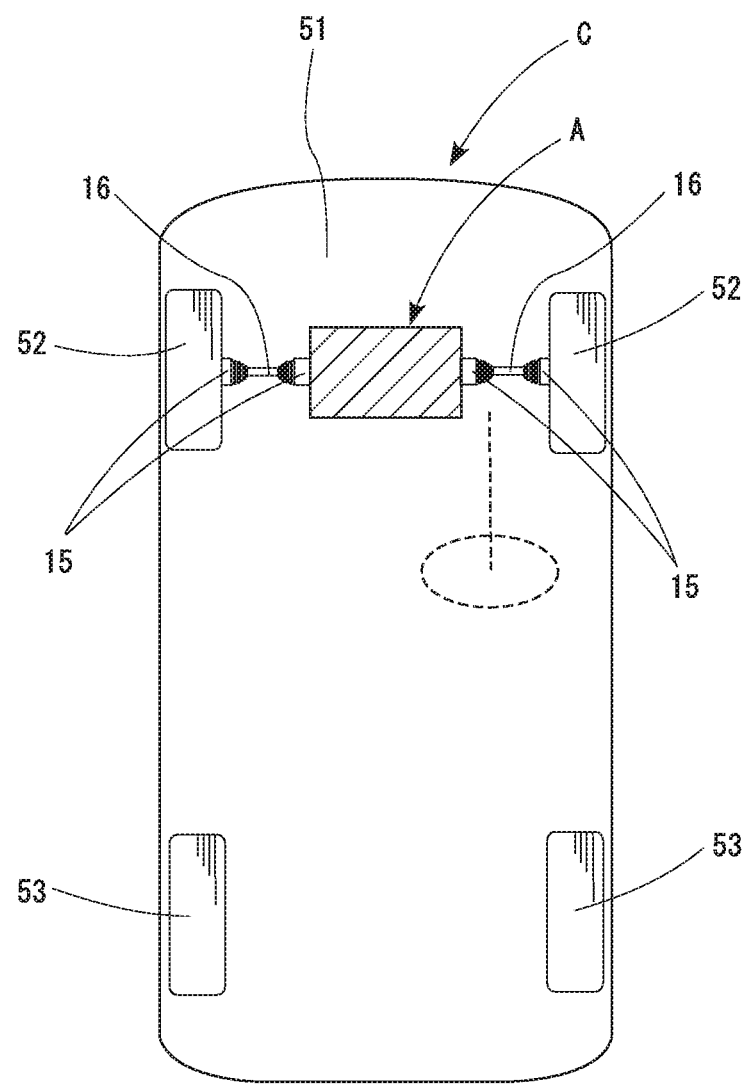
FIG. 2 is a schematic plan view which shows an example of electric vehicle utilizing the two-motor automobile-motor driving device equipped with speed reducer according to the present invention.

FIG. 2 shows an electric vehicle C, which uses a front-wheel driving method and includes: a chassis 51; front wheels 52 as driving wheels; rear wheels 53; and the two-motor automobile-motor driving device equipped with speed reducer A which drives the left and right driving wheels independently from each other. The two-motor automobile-motor driving device equipped with speed reducer A is mounted on the chassis 51, at a center position between the driving wheels represented by the left and right front wheels 52. Driving power from the two-motor automobile-motor driving device equipped with speed reducer A is transmitted though constant-velocity joints 15 and intermediate shafts 16, to the left and right front wheels 52 which serve as the driving wheels.

It should be noted here that the two-motor automobile-motor driving device equipped with speed reducer A may be mounted in different modes other than for front-wheel driving method as shown in FIG. 2, such as for rear-wheel driving method and four-wheel driving method.

The left and right electric motors 1L, 1R in the two-motor automobile-motor driving device equipped with speed reducer A are housed in the motor casings 3L, 3R as shown in FIG. 1.

The motor casings 3L, 3R include: cylindrical motor casing main bodies 3aL, 3aR; outer walls 3bL, 3bR which close outer surfaces of the motor casing main bodies 3aL, 3aR; and inner walls 3cL, 3cR which provide separation from the speed reducers 2L, 2R on inner surfaces of the motor casing main bodies 3aL, 3aR. The inner walls 3cL, 3cR of the motor casing main bodies 3aL, 3aR have openings for the motor shafts 12a to extend therefrom.

As shown in FIG. 1, the electric motors 1L, 1R are provided by a radial gap type motors, in which stators 11 are provided on inner circumferential surfaces in the motor casing main bodies 3aL, 3aR; and rotors 12 are placed along inner circumferential surfaces of the stators 11. The electric motors 1L, 1R may be provided by axial gap type motors.

The rotors 12 have their motor shafts 12a at its center. The motor shafts 12a extend through the openings in the inner walls 3cL, 3cR of the motor casing main bodies 3aL, 3aR, toward the respective speed reducers 2L, 2R. Seal members 13 are provided between the openings in the motor casing main bodies 3aL, 3aR and the motor shafts 12a.

The motor shafts 12a are supported rotatably by rolling bearings 14a, 14b in the inner walls 3cL, 3cR and the outer walls 3bL, 3bR of the motor casing main bodies 3aL, 3aR (FIG. 1).

Figure 3:
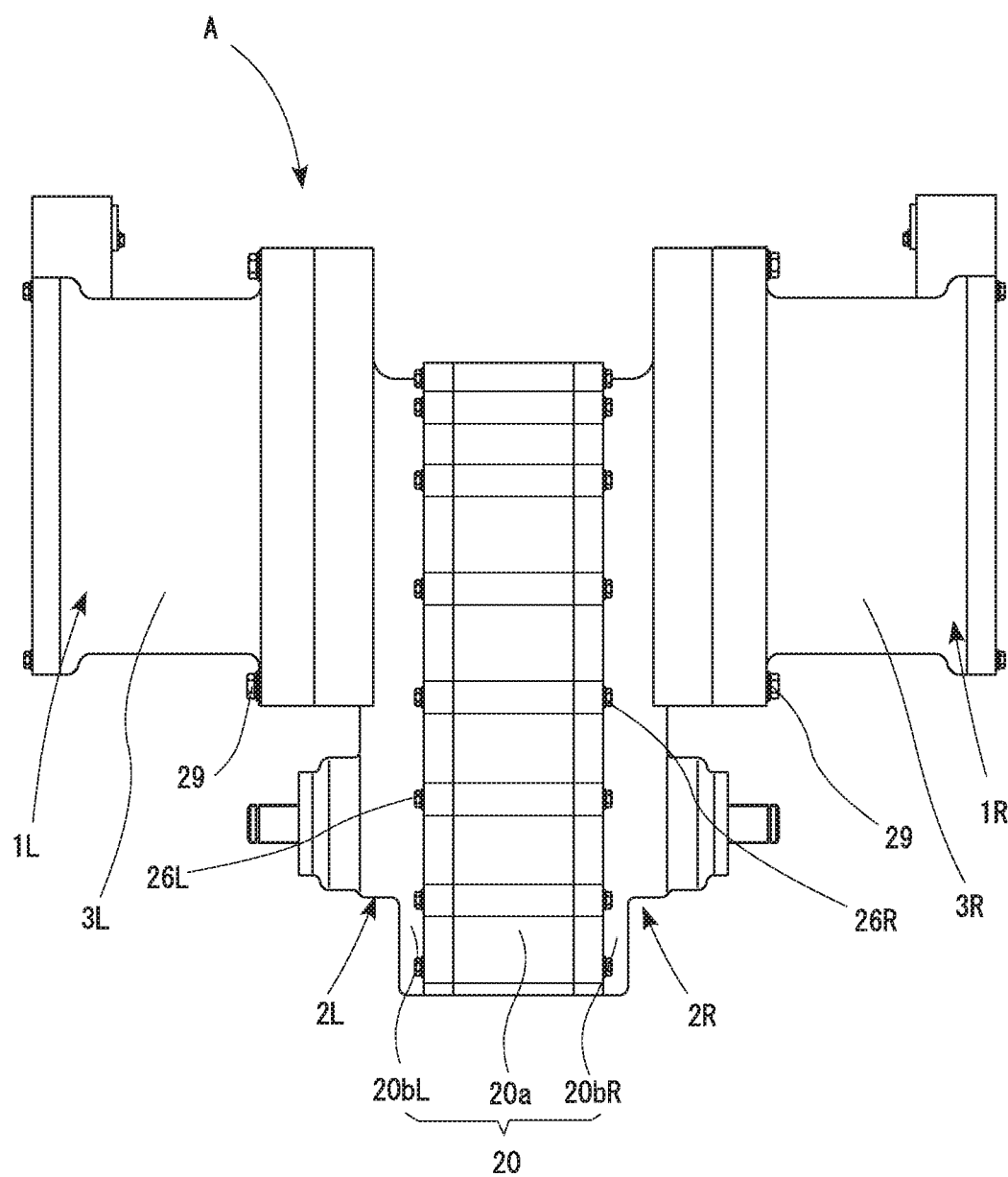
FIG. 3 is a plan view of the embodiment in FIG. 1.

As shown in FIG. 1 and FIG. 3, the speed reducer casing 20 which houses the two speed reducers 2L, 2R, which are placed side by side, one on the left and the other on the right, has a three-piece structure composed of a center casing 20a, and a left and a right side casings 20bL, 20bR which are fixed on two side surfaces of the center casing 20a. The left and right side casings 20bL, 20bR are fixed with a plurality of bolts 26L, 26R in openings on two sides of the center casing 20a (FIG. 3).

By fixing outboard side surfaces of the side casings 20bL, 20bR of the speed reducer casing 20 (outward side of the car body) and the inner walls 3cL, 3cR of the motor casing main bodies 3aL, 3aR of the electric motors 1L, 1R with a plurality of bolts 29, the two electric motors 1L, 1R are disposed in a fixed fashion on the left and right of the speed reducer casing 20 (FIG. 1 and FIG. 3).

As shown in FIG. 1, the center casing 20a is provided with a partition wall 21 at its center. The partition wall 21 divides the speed reducer casing 20 into a left and a right independent housing chambers for housing the two speed reducers 2L, 2R.

As shown in FIG. 1, the speed reducers 2L, 2R are disposed symmetrically with each other in the left and right direction. The speed reducers 2L, 2R are provided by parallel shaft gear speed reducers including: input gear shafts 23L, 23R which have input gears 23a for receiving power from the motor shafts 12a; intermediate gear shafts 24L, 24R which have large-diameter gears 24a for engagement with the input gears 23a, and small-diameter gears 24b for engagement with output gears 25a; and output gear shafts 25L, 25R which extend from the speed reducer casing 20 for transmission of driving power to the driving wheels via the constant-velocity joints 15 and the intermediate shafts 16 (FIG. 2). In the two, left and right, speed reducers 2L, 2R, gear shafts of the same number, i.e., the input gear shafts 23L, 23R, the intermediate gear shafts 24L, 24R, and the output gear shafts 25L, 25R are disposed coaxially with each other.

Two ends of the input gear shafts 23L, 23R in the speed reducers 2L, 2R are supported rotatably, via rolling bearings 28a, 28b, by bearing fitting holes 27a which are formed in two, left and right surfaces of the partition wall 21 in the center casing 20a, and bearing fitting holes 27b which are formed in the side casings 20bL, 20bR.

The input gear shafts 23L, 23R have their outboard ends extended outward from openings 27c which are formed in the side casings 20bL, 20bR. Oil seals 31 are provided between the openings 27c and outboard ends of the input gear shafts 23L, 23R, to prevent leakage of lubrication oil from inside of the speed reducers 2L, 2R and to prevent entry of mud water, for example, from outside.

The motor shafts 12a are hollow. Through these hollow motor shafts 12a, the input gear shafts 23L, 23R are inserted. The input gear shafts 23L, 23R and the motor shafts 12a are spline-connected with each other (including serration; the same applies hereinafter).

The intermediate gear shafts 24L, 24R are provided by stepped gear shafts which include the large-diameter gears 24a engaged with the input gears 23a, and the small-diameter gears 24b engaged with the output gears 25a, on their outer circumferential surfaces. Two ends of the intermediate gear shafts 24L, 24R are supported rotatably, via rolling bearings 34a, 34b, in bearing fitting holes 32a which are formed in two surfaces of the partition wall 21 in the center casing 20a, and bearing fitting holes 32b which are formed in the side casings 20bL, 20bR.

The output gear shafts 25L, 25R have large-diameter output gears 25a, and are supported by rolling bearings 37a, 37b in bearing fitting holes 35a which are formed in two surfaces of the partition wall 21 in the center casing 20a and bearing fitting holes 35b which are formed in the side casings 20bL, 20bR.

Outboard ends of the output gear shafts 25L, 25R extend from openings 35c which are formed in the side casings 20bL, 20bR, out of the speed reducer casing 20. The constant-velocity joints 15 have their outer joints 15a spline-connected around outer circumferential surfaces of the outboard ends of the extended output gear shafts 25L, 25R.

The constant-velocity joints 15 connected with the output gear shafts 25L, 25R are connected with the driving wheels 52 via the intermediate shafts 16 (FIG. 2).

Oil seals 39 are provided between the outboard ends of the output gear shafts 25L, 25R and the openings 35c formed in the side casings 20bL, 20bR, to prevent leakage of lubrication oil from inside of the speed reducers 2L, 2R and to prevent entry of mud water, for example, from outside.

Figure 5:
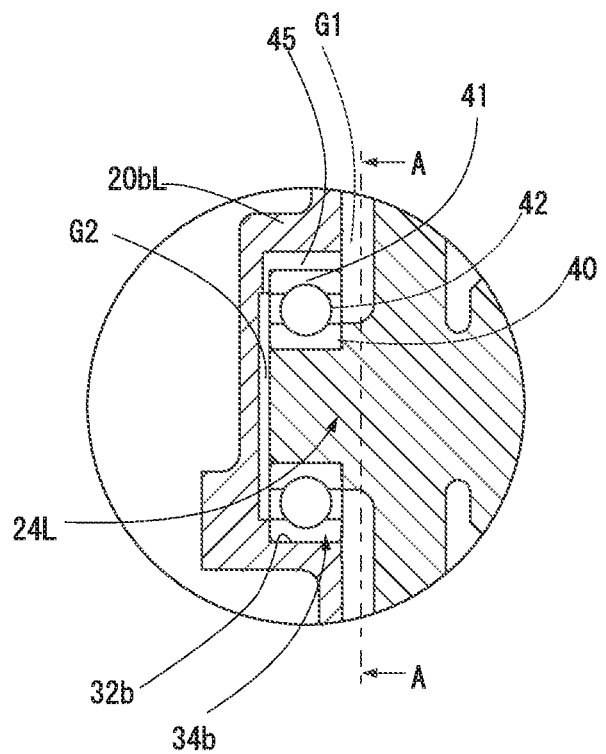
FIG. 5 is an enlarged view of a region A circled with a broken line in FIG. 1.

As shown in FIG. 5 for the intermediate gear shaft 24L, two ends of the input gear shafts 23L, 23R, of the intermediate gear shafts 24L, 24R and of the output gear shafts 25L, 25R are fitted with inner rings 40 of the respective rolling bearings 28a, 28b, 34a, 34b, 37a, 37b. Outer rings 41 of the rolling bearings 28a, 28b, 34a, 34b, 37a, 37b are fitted into the bearing fitting holes 27a, 32a, 35a of the center casing 20a and the bearing fitting holes 27b, 32b, 35b of the side casings 20bL, 20bR.

In the rolling bearings 28a, 28b, 34a, 34b, 37a, 37b which support the input gear shafts 23L, 23R, the intermediate gear shafts 24L, 24R and the output gear shafts 25L, 25R of the speed reducers 2L, 2R, appropriate amounts of lubrication oil are supplied to bearing track surfaces and contact areas between rolling elements and retainers to prevent damages such as seizure, and to satisfy requirements of rolling fatigue life. It should be noted here that for the sake of simplicity in description, the inner ring 40, the outer ring 41, the rolling elements 42 and the groove 45 as constituent elements of each rolling bearings 28a, 28b, 34a, 34b, 37a, 37b are indicated by using the same reference symbols.

In the oil bath method, lubrication oil pooled in a lower part of the speed reducer casing is kicked up by the gears to supply splashes of oil to tooth surfaces and the rolling bearings.

Simple oil bath lubrication can increase chances for a problem when the rolling bearings are rotating at a high speed; i.e., rotating movement of the rolling elements and the retainer can prevent lubrication oil from flowing inside the rolling bearings. In order to supply lubrication oil into the bearings, it is effective to create an axial through flow of oil running through the bearings.

The present embodiment makes use of a structure for creating the flow. As shown in FIG. 5 which gives an enlarged view of the region circled with an broken line A in FIG. 1, and shown in FIG. 6 which gives a sectional view taken in a line A-A FIG. 5, at least one groove 45 is provided in an inner circumferential surface of the bearing fitting hole 32b in which the rolling bearing 34b is fitted, for communication between a space in the speed reducer casing 20 and an inside space of the bearing fitting hole 32b. In other words, as shown in FIG. 5, with the rolling bearing 34b as a divider, there is a space in the casing 20 which will be called gear space G1 where there are gears and other components provided therein, and there is a space which will be called inside space G2, which is closed by the bearing fitting hole 32b formed in the side casing 20bL of the casing 20; and there is provided one or more grooves 45 in an inner circumferential surface of the bearing fitting hole 32b that is formed in the side casing 20bL for fitting the outer ring 41 of the rolling bearing 34b, to establish communication between the gear space G1 and the inside space G2.

Because of this groove 45, oil enters from the groove 45, flows through the inside space G2 and the inside space of the rolling bearing 34b, and then flows out, or oil enters from the rolling bearing 34b, flows through the inside space G2 and the groove 45 and then flow out, depending on the location where the groove 45 is made. For example, if the groove 45 is above the center of the shaft, oil comes from the gear space G1, flows through the groove 45, then the inside space G2 and the inside space of the rolling bearing 34b, and then flows out to the gear space G1. If the groove 45 is below the center of the shaft, oil comes from the gear space G1, flows through the inside space of the rolling bearing 34b, then through the inside space G2 and the groove 45, and then flows out to the gear space G1. Therefore, lubrication oil is supplied to inside of the rolling bearing 34b.

Figure 6:
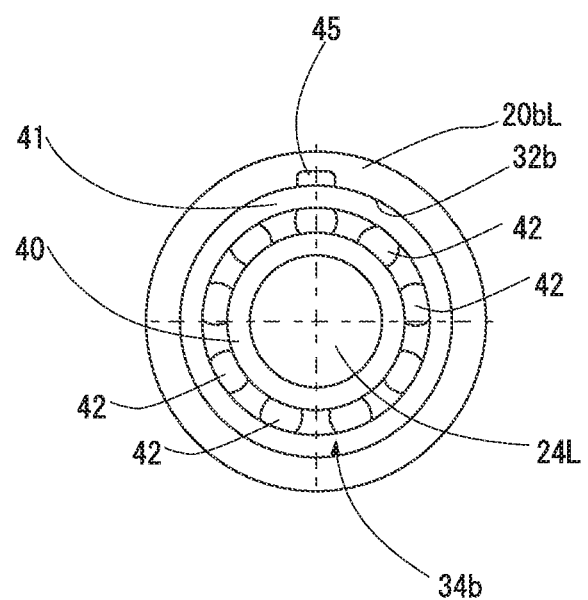
FIG. 6 is an explanatory view representing a section taken in a line A-A in FIG. 5.

For the sake of convenience, the above description which was made with reference to FIG. 1, FIG. 5 and FIG. 6 was only for the bearing fitting hole 32b of the side casing 20bL in which the rolling bearing 34b is fitted; similarly however, one or more of the groove 45 for establishing communication between the gear space G1 and the inside space G2 are provided in the inner circumferential surfaces of the other bearing fitting holes 27a, 32a, 35a of the center casing 20a, the bearing fitting holes 27b, 35b of the side casing 20bL, and the bearing fitting holes 27b, 32b, 35b of the side casing 20bR into which the rolling bearings 28a, 28b, 34a, 37a, 37b are fitted.

If the above-described grooves 45 were provided in the inner circumferential surface of the bearing fitting hole of the casing 20, i.e., in a surface fitted by the outer ring of the rolling bearing, there would be a problem that the outer ring 41 is deformed by a load acted onto the outer ring 41 via the rolling elements 42 when the rolling elements 42 roll over the phase of groove 45. Once the outer ring 41 is deformed, the outer ring track surface will no longer have sufficient level of roundness, and can adversely affect on vibration, noise, durability, etc.

Figure 4:
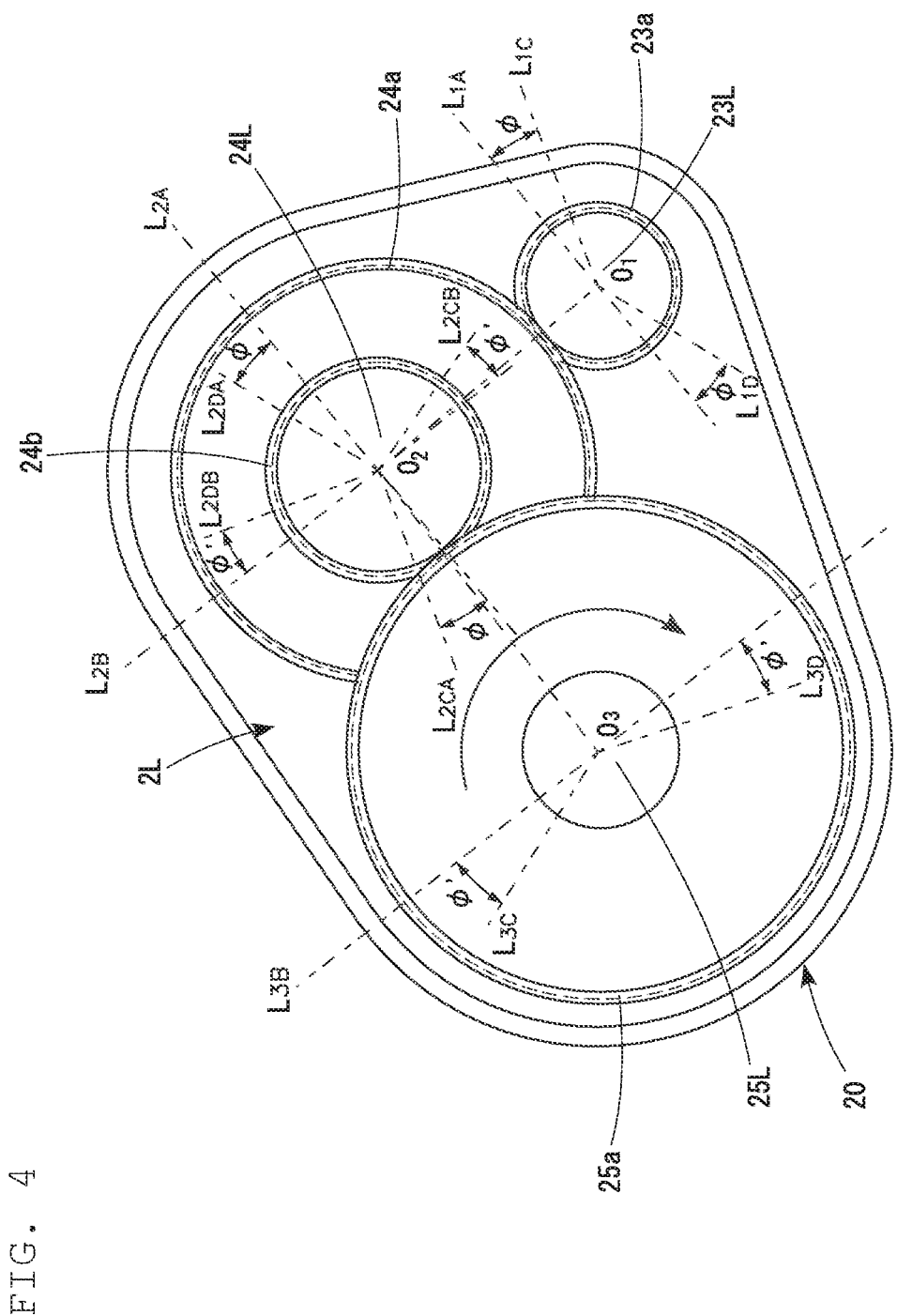
FIG. 4 is an explanatory view of a gear train in the embodiment in FIG. 1, viewed from an axial direction.

FIG. 4 shows a layout of the gears on the input gear shaft 23L, the intermediate gear shaft 24L and output gear shaft 25L of the speed reducer 2L in the two-motor automobile-motor driving device equipped with speed reducer A as mounted on the electric vehicle C shown in FIG. 2. The figure is a view from inboard side (from inside the car body) toward outboard side. The input gear shaft 23L is at a more forward location of the vehicle than the output gear shaft 25L, while the intermediate gear shaft 24L is at a higher location than the input gear shaft 23L and the output gear shaft 25L. When the vehicle travels forward, the output gear shaft 25L rotates clockwise as indicated by an arrow in the drawing. Note here that the speed reducer 2R has a mirror symmetric layout with the one in FIG. 4. As shown in FIG. 4, when the gears rotate in engagement with each other, there is a load zone over a specific range in the circumferential direction inside a rolling bearing, where a load acts between the rolling elements and the track ring. The largest load acts on a line of action of a load. FIG. 4 shows directions in which the lines of action of the loads occur.

In the present embodiment, the groove 45 is formed in the inner circumferential surface of the bearing fitting hole in the casing 20 in a direction in which the groove 45 does not cross the corresponding line of action of the load acting on the rolling bearing.

By making the arrangement as the above, it becomes possible to reduce deformation of the outer ring 41 when the rolling elements 42 roll on the phase of the groove 45, thereby preventing performance decay of the bearing.

Next, the line of action of a load will be described with reference to the gear arrangement in FIG. 4. In the present embodiment, the line of action of the load is defined as follows:

The input gear 23a and the large-diameter gear 24a mesh with each other on a gear meshing train A, whereas the small-diameter gear 24b and the output gear 25a mesh with each other on a gear meshing train B. The input gear shaft 23L has an axial center $O_1$, the intermediate gear shaft 24L has an axial center $O_2$ and the output gear shaft 25L has an axial center $O_3$.

In FIG. 4, $L_{1A}$ and $L_{2A}$ are straight lines perpendicular to a straight line which connects the axial center $O_1$ and the axial center $O_2$ with each other and passing the axial center $O_1$ and the axial center $O_2$ respectively. $L_{2B}$ and $L_{3B}$ are straight lines perpendicular to a straight line which connects the axial center $O_2$ and the axial center $O_3$, and passing the axial center $O_2$ and the axial center $O_3$ respectively.

Gear meshing between the input gear 23a and the large-diameter gear 24a, i.e., gear meshing in the gear train A, causes a load, at a time of acceleration (on the driving side), onto the rolling bearings 28a, 28b of the input gear shaft 23L, the line of action of this load will be called $L_{1D}$.

Gear meshing between the input gear 23a and the large-diameter gear 24a, i.e., gear meshing in the gear train A, causes a load, at a time of deceleration (on the coasting side), onto the rolling bearings 28a, 28b of the input gear shaft 23L, and the line of action of this load will be called $L_{1C}$.

Gear meshing between the input gear 23a and the large-diameter gear 24a in the gear train A causes a load, at a time of acceleration (on the driving side), onto the rolling bearings 34a, 34b of the intermediate gear shaft 24L, and the line of action of this load will be called $L_{2DA}$.

Gear meshing between the input gear 23a and the large-diameter gear 24a in the gear train A causes a load, at a time of deceleration (on the coasting side), onto the rolling bearings 34a, 34b of the intermediate gear shaft 24L, and the line of action of this load will be called $L_{2CA}$.

Gear meshing between the small-diameter gear 24b and the output gear 25a, i.e., the gear meshing in the gear train B, causes a load, at a time of acceleration (on the driving side), onto the rolling bearings 34a of the intermediate gear shaft 24L, and the line of action of this load will be called $L_{2DB}$.

Gear meshing between the small-diameter gear 24b and the output gear 25a in the gear train B causes a load, at a time of deceleration (on the coasting side), onto the rolling bearings 34a, 34b of the intermediate gear shaft 24L, and the line of action of this load will be called $L_{2CB}$.

Gear meshing between the small-diameter gear 24b and the output gear 25a in the gear train B causes a load, at a time of acceleration (on the driving side), onto the rolling bearings 37a, 37b of the output gear shaft 25L, and the line of action of this load will be called $L_{3D}$.

Gear meshing between the small-diameter gear 24b and the output gear 25a in the gear train B causes a load, at a time of deceleration (on the coasting side), onto the rolling bearings 37a, 37b of the output gear shaft 25L, and the line of action of this load will be called $L_{3C}$.

$L_{1D}$ crosses $L_{1A}$, and $L_{1C}$ crosses $L_{1A}$ at an angle of $\varphi$.
$L_{2DA}$ crosses $L_{2A}$, and $L_{2CA}$ crosses $L_{2A}$ at an angle of $\varphi$.
$L_{2DB}$ crosses $L_{2B}$, and $L_{2CB}$ crosses $L_{2B}$ at an angle of $\varphi'$.
$L_{3D}$ crosses $L_{3B}$, and $L_{3C}$ crosses $L_{3B}$ at an angle of $\varphi'$.

The angles $\varphi$ and $\varphi'$ are given by the following mathematical expressions based on the gears' tooth surface pressure angles, and tooth surface helix angles.

$$\tan \varphi = \tan \alpha / \cos \beta$$

$$\tan \varphi' = \tan \alpha' / \cos \beta'$$

where, $\alpha$ and $\alpha'$ represent tooth surface pressure angles, while $\beta$, $\beta'$ represent tooth surface helix angles.

In other words, the line of action of the load can be defined by means of axial center positions and gear specifications (pressure angles and helix angles). In the present invention, the axial center positions and gear specifications (pressure angles and helix angles) are used to obtain the lines of action of the loads, and one or more of the grooves 45 are formed at position(s) not crossing any of these lines to establish communication between the gear space G1 and the inside space G2.

Figure 7A:
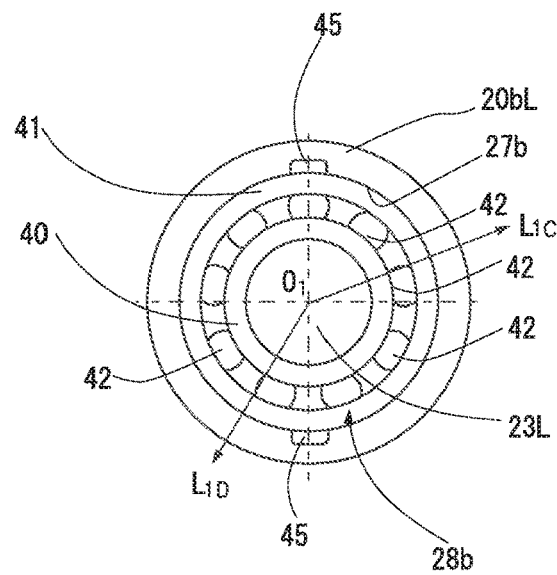
FIG. 7A is an explanatory view which shows a bearing in an input gear shaft.
Figure 7B:
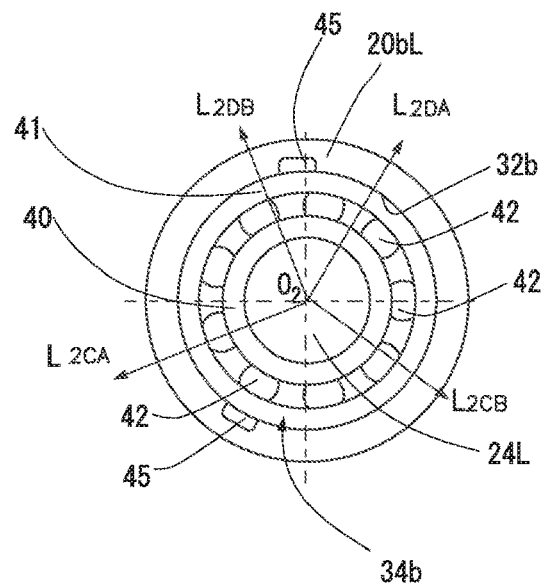
FIG. 7B is an explanatory view which shows a bearing in an intermediate gear shaft.
Figure 7C:
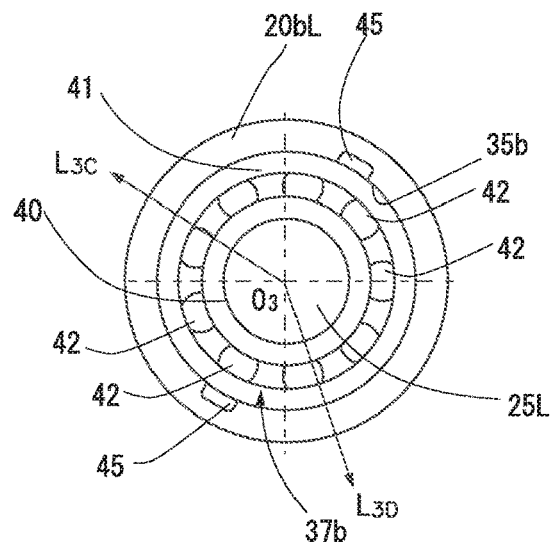
FIG. 7C is an explanatory view which shows a bearing in an output gear shaft.

FIG. 7A through FIG. 7C show examples of the grooves 45 provided in the bearing fitting holes 27b, 32b, 35b. FIG. 7A shows the rolling bearing 28b which supports the input gear shaft 23L. Since the input gear 23a (see FIG. 4) has the driving-side line of action of a load $L_{1D}$, and the coasting-side line of action of a load, these two lines of action of the loads are avoided for locations of two grooves 45 in the bearing fitting hole 27b.

FIG. 7B shows the rolling bearing 34b which supports the intermediate gear shaft 24L. Since the intermediate gear shaft 24L is provided with the large-diameter gear 24a which makes engagement with the input gear 23a, and the small-diameter gear 24b which makes engagement with the output gear 25a (see FIG. 4), i.e., since there are two driving-side lines of action of the loads $L_{2DA}$, $L_{2DB}$, and two coasting-side lines of action of the loads $L_{2CA}$, $L_{2CB}$, these four lines of action of the loads are avoided in providing two grooves 45 in the bearing fitting hole 32b.

FIG. 7C shows the rolling bearing 37b which supports the output gear shaft 25L. Since the output gear 25a has the driving-side line of action of a load $L_{3D}$ and the coasting-side line of action $L_{3C}$, these two lines of action of the loads are avoided in providing two grooves 45 in the bearing fitting hole 35b.

These grooves 45 which are provided in the bearing fitting holes 27b, 32b, 35b and at higher locations than the axial center serve mainly as an entrance for lubrication oil, whereas the grooves 45 at lower locations than the axial center serve mainly as an exit of lubrication oil. The lubrication oil flows along end surfaces of the rolling bearings 28b, 34b, 37b, and the lubrication oil is supplied to inside of the rolling bearings 28b, 34b, 37b as it flows along these end surfaces.

Figure 8:
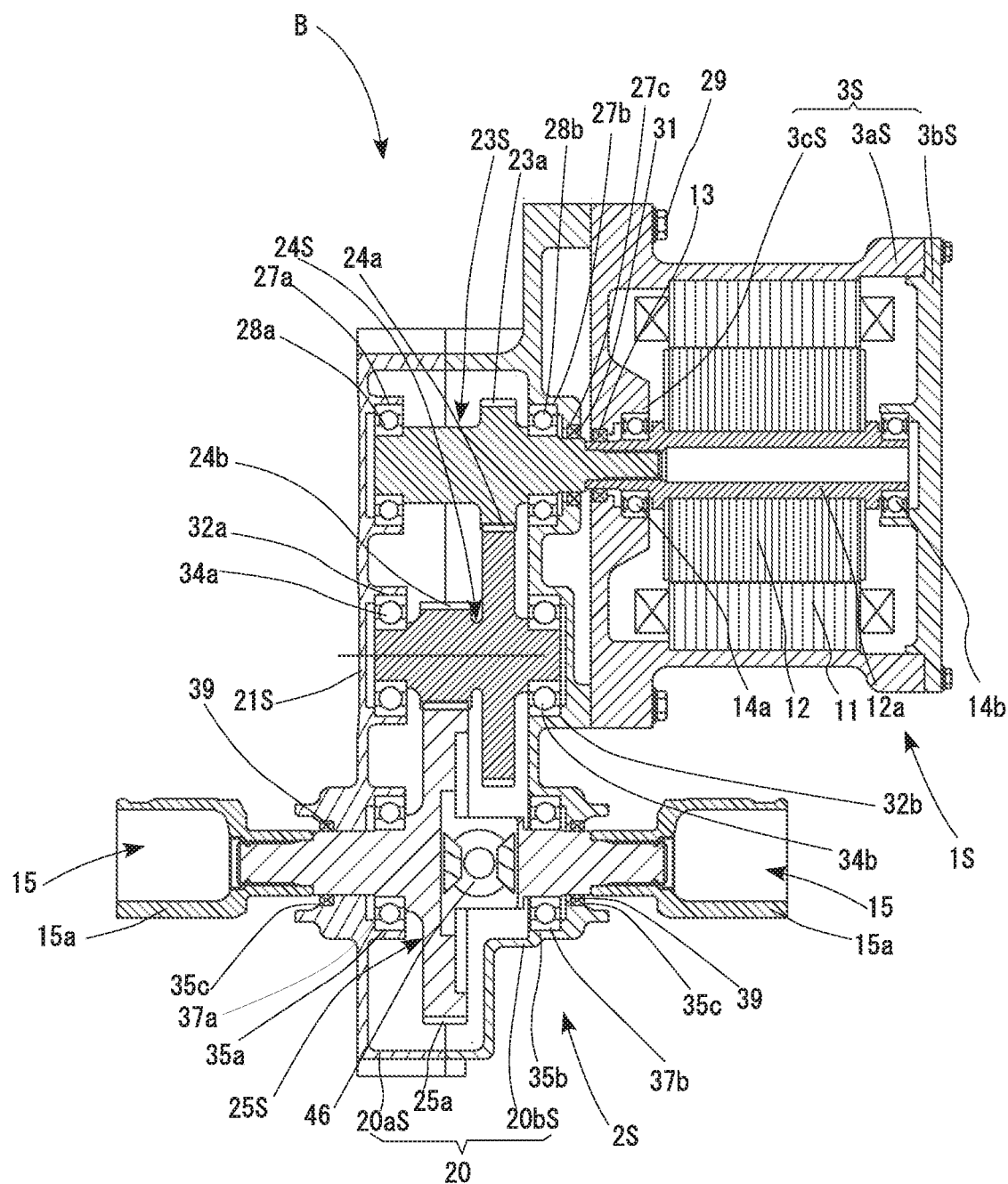
FIG. 8 is a cross-sectional plan view which shows an embodiment of a one-motor automobile-motor driving device equipped with speed reducer according to the present invention.
Figure 9:
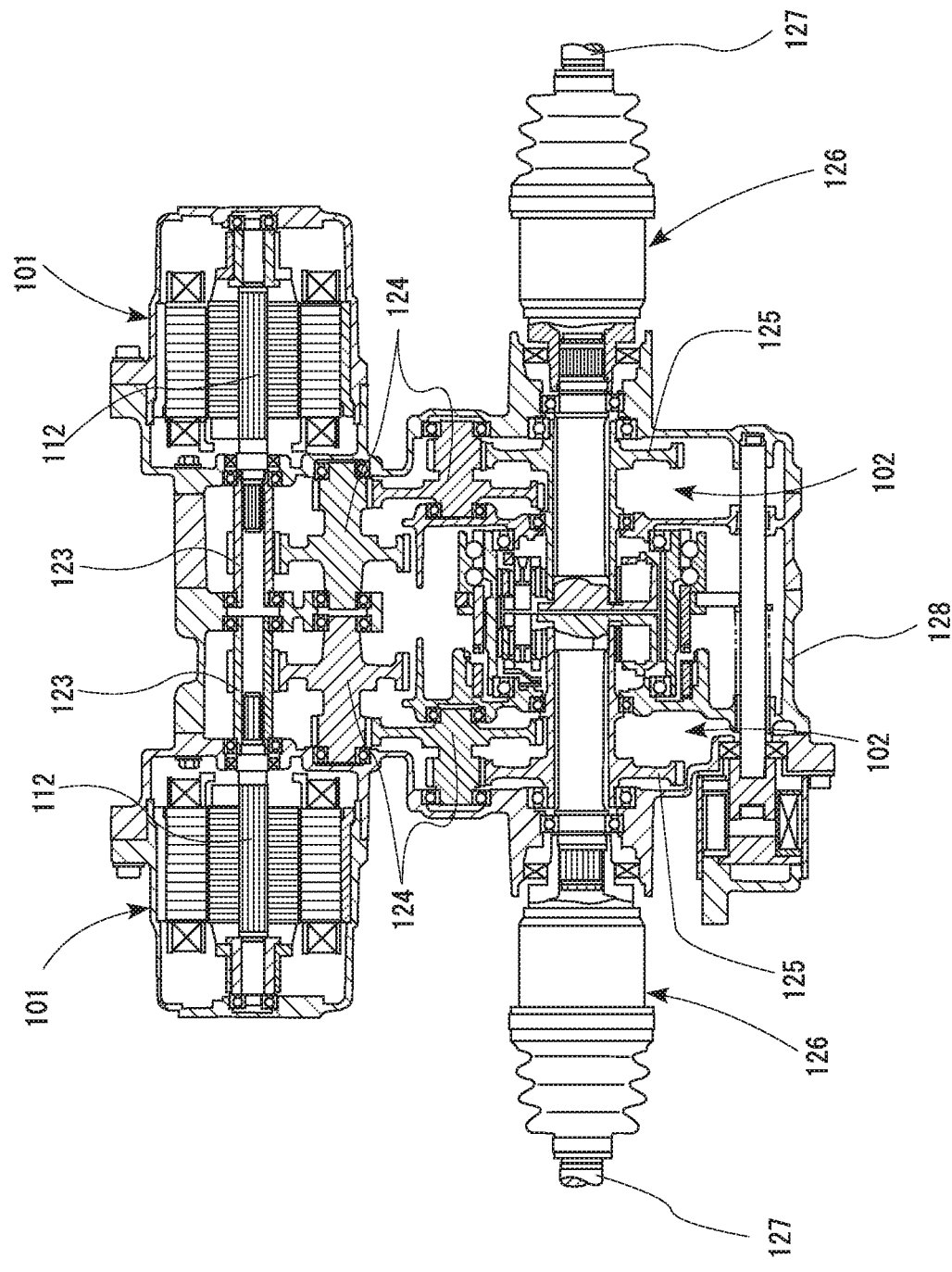
FIG. 9 is a cross-sectional plan view which shows a conventional two-motor automobile-motor driving device equipped with speed reducer.

In the embodiment described above, description was made for the two-motor automobile-motor driving device equipped with speed reducer A as an example; however, the present invention is also applicable to one-motor automobile-motor driving device equipped with speed reducers. In a one-motor automobile-motor driving device equipped with speed reducer, a speed reducer casing 20 includes a motor-side casing and a speed-reducer-side casing. The motor-side casing replaces the side casings 20bL, 20bR, and the speed-reducer-side casing replaces the center casing 20a in the two-motor automobile-motor driving device equipped with speed reducer A. Referring to FIG. 8, description will cover the one-motor automobile-motor driving device equipped with speed reducer. Note that those constituent elements which have been covered in the description of the two-motor automobile-motor driving device equipped with speed reducer may be indicated with the same reference symbols.

In the one-motor automobile-motor driving device equipped with speed reducer B, an electric motor 1S is housed in a motor casing 3S as shown in FIG. 8.

The motor casing 3S includes a cylindrical motor casing main body 3aS, an outer wall 3bS which closes an outer surface of this motor casing main body 3aS, and an inner wall 3cS which separates the speed reducer 2S on the inside of the motor casing main body 3aS. In the inner wall 3cS of the motor casing main body 3aS, an opening is provided for the motor shaft 12a to be extended.

As shown in FIG. 8, the electric motor 1S is provided by a radial gap type motor, in which a stator 11 is provided on inner circumferential surface of the motor casing main body 3aS; and a rotor 12 is placed along inner circumferential surface of the stator 11. The electric motor 1S may be provided by an axial gap type motor.

The rotor 12 has its motor shaft 12a at its center. The motor shaft 12a extends through the opening in the inner wall 3cS of the motor casing main body 3aS, toward the speed reducer 2S. Seal members 13 are provided between the opening in the motor casing main body 3aS and the motor shaft 12a.

The motor shaft 12a is supported rotatably by the inner wall 3cS and the outer wall 3bS in the motor casing main body 3aS via rolling bearings 14a, 14b (FIG. 8).

As shown in FIG. 8, the speed reducer casing 20 which houses the speed reducer 2S has a two-piece structure, composed of a side-wall casing 20aS and a side-surface casing 20bS which is fixed between the side-wall casing 20aS and the motor casing 3S. The side-surface casing 20bS and the side-wall casing 20aS are fixed with a plurality of unillustrated bolts.

By fixing a side surface of the side-surface casing 20bS of the speed reducer casing 20 and the inner wall 3cS of the motor casing main body 3aS of the electric motor 1S with a plurality of bolts 29 with each other, the electric motor 1S is disposed onto the speed reducer casing 20 in a fixed fashion (FIG. 8).

A housing chamber for housing the speed reducer 2S is provided between the side-wall casing 20aS and the side-surface casing 20bS.

As shown in FIG. 8, the speed reducer 2S is a parallel shaft gear speed reducer including: an input gear shaft 23S which has an input gear 23a for receiving power from the motor shaft 12a; an intermediate gear shaft 24S which has a large-diameter gear 24a for engagement with the input gear 23a, and a small-diameter gear 24b for engagement with an output gear 25a; and an output gear shaft section 25S which has an output gear 25S and a differential mechanism 46 for the left and right wheels, extending from the speed reducer casing 20 to the left and to the right for transmission of driving power to driving wheels 52 (see FIG. 2) via constant-velocity joints 15 and intermediate shafts 16.

The input gear shaft 23S of the speed reducer 2S has its two ends rotatably supported by a bearing fitting holes 27a formed in a side wall 21S of the side-wall casing 20aS and the bearing fitting holes 27b formed in the side-surface casing 20bS, via rolling bearings 28a, 28b.

The input gear shaft 23S has its end closer to the electric motor 1S extended outward from an opening 27c which are formed in the side-surface casing 20bS. Oil seals 31 are provided between the opening 27c and an outboard end of the input gear shaft 23S, to prevent leakage of lubrication oil from inside of the speed reducer 2S and to prevent entry of mud water, for example, from outside.

The motor shaft 12a is hollow. Through this hollow motor shaft 12a, the input gear shaft 23S is inserted. The input gear shaft 23S and the motor shaft 12a are spline-connected with each other.

The intermediate gear shaft 24S is provided by a stepped gear shaft which includes the large-diameter gear 24a engaged with the input gear 23a, and the small-diameter gear 24b engaged with the output gear 25a, on its outer circumferential surface. The intermediate gear shaft 24S has its two ends supported by bearing fitting holes 32a formed in the side wall 21S of the side-wall casing 20aS and bearing fitting holes 32b formed in the side-surface casing 20bS, via rolling bearings 34a, 34b.

The output gear shaft section 25S has a large-diameter output gear 25a and the differential mechanism 46, and is supported by bearing fitting holes 35a formed in the side wall 21S of the side-wall casing 20aS and bearing fitting holes 35b formed in the side-surface casing 20bS, via rolling bearings 37a, 37b.

The output gear shaft section 25S has its ends extended from openings 35c which are formed in the side-wall casing 20aS and the side-surface casing 20bS, out of the speed reducer casing 20. The extended output gear shaft section 25S has outer circumferential surfaces on its left and right ends spline-connected into outer joints 15a of the constant-velocity joints 15.

The constant-velocity joints 15 connected with the output gear shaft section 25S are connected with the driving wheels via the intermediate shafts 16.

Oil seals 39 are provided between the left and right end portions of the output gear shaft section 25s and their corresponding openings 35c formed in the side-wall casing 20aS and the side-surface casing 20bS, to prevent leakage of lubrication oil from inside of the speed reducer 2S and entry of mud water, for example, from outside.

With the above arrangement, in these bearings 28a, 28b, 34a, 34b, 37a, 37b which support the input gear shaft 23S, the intermediate gear shaft 24S and the output gear shaft section 25S of the speed reducer 2S, appropriate amounts of lubrication oil are supplied to bearing track surfaces and contact areas between rolling elements and retainers to prevent damages such as seizure, and to satisfy requirements of rolling fatigue life.

Again in this embodiment, at least one groove is provided in each inner circumferential surface of the bearing fitting holes 27a, 27b, 32a, 32b, 35a, 35b in which the rolling bearings 28a, 28b, 34a, 34b, 37a, 37b are fitted, for communication between a space in the casing 20S which houses the speed reducer and an inside space of the bearing fitting holes. These grooves are provided at locations not crossing the lines of action of the loads. By making the arrangement as the above, deformation of the outer ring is reduced when the rolling elements of the rolling bearings pass on the phase of the grooves, thereby preventing performance decay of the bearing.

It is a matter of fact that the present invention is not limited by the embodiments described thus far, and can be implemented in various ways within the scope of the present invention. The scope of the present invention is given by the Claims, and includes all changes which are equivalent in meaning or within the range of the Claims.

REFERENCE SIGNS LIST

- 1L, 1R, 1S: electric motors
- 2L, 2R, 2S: speed reducers
- 3L, 3R, 3S: motor casings
- 3aL, 3aR, 3aS: motor casing main bodies
- 3bL, 3bR, 3bS: the outer walls
- 3cL, 3cR, 3cS: the inner walls
- 11: stator
- 12: rotor
- 12a: motor shaft
- 13: Seal member
- 14a, 14b: rolling bearings
- 15: constant-velocity joint
- 15a: Outer joint
- 16: intermediate shaft
- 20: speed reducer casing
- 20a: center casing
- 20aS: Side-wall casing
- 20bL, 20bR, 20bS: Side-face casings
- 21: partition wall
- 21S: Side wall
- 23L, 23R, 23S: input gear shafts
- 23a: input gear
- 24L, 24R, 24S: intermediate gear shafts
- 24a: large-diameter gear
- 24b: small-diameter gear
- 25L, 25R: output gear shafts
- 25S: output gear shaft section
- 25a: output gear
- 26L, 26R: bolts
- 27a, 27b: bearing fitting holes
- 27c: opening
- 28a, 28b: rolling bearings
- 29: bolt
- 31: oil seal
- 32a, 32b, 35a, 35b: bearing fitting holes
- 34a, 34b, 37a, 37b: rolling bearings
- 35c: opening
- 39: oil seal
- 40: inner ring
- 41: outer ring
- 42: rolling element
- 45: groove
- 46: differential mechanism
- 51: chassis
- 52: front wheel
- 53: rear wheel
- A, B: automobile-motor driving devices equipped with speed reducer
- C electric vehicle
- G1: gear space
- G2: inside space
- $\alpha, \alpha'$: tooth surface pressure angles
- $\beta, \beta'$: tooth surfaces helix angles
- $\varphi, \varphi'$: Angles
- $O_1, O_2, O_3$: the axial center
- $L_{1D}, L_{1C}, L_{2D4}, L_{2CA}, L_{2DB}, L_{2CB}, L_{3D}, L_{3C}$: lines of Action of Loads

The invention claimed is:

1. An automobile-motor driving device, comprising:
   an electric motor; and
   a speed reducer for reducing and then transmitting power from the electric motor to a driving wheel,
   wherein the speed reducer is provided by a parallel shaft gear speed reducer having a plurality of gear shafts,
   wherein the plurality of gear shafts include an input gear shaft having an input gear for receiving power from a motor shaft, an output gear shaft having an output gear for transmitting driving power to the driving wheel, and one or more intermediate gear shafts having intermediate gears provided between the input gear shaft and the output gear shaft,
   wherein each of the plurality of gear shafts is supported at two ends thereof via rolling bearings which are fitted into bearing fitting holes formed in a speed reducer casing that houses the parallel shaft gear speed reducer, and
   wherein an inner circumferential surface of each of the bearing fitting holes is formed with at least one groove for communication between a space that houses the speed reducer and an inside space of the bearing fitting hole, the at least one groove being formed at a location not crossed by a line of action of a load acting upon the rolling bearing fitted into the bearing fitting hole due to the meshing of gears.

2. The automobile-motor driving device according to claim 1, wherein the electric motor is one electric motor, and the speed reducer is one speed reducer.

3. The automobile-motor driving device according to claim 1, wherein the electric motor is two electric motors each for driving one of left and right driving wheels independently from each other, and the speed reducer is two speed reducers each for reducing and then transmitting power from the two electric motors to left and right driving wheels independently from each other.

* * * * *